No. 786,527.

Patented April 4, 1905.

UNITED STATES PATENT OFFICE.

HEINRICH SPATZ, OF SCHÖNEBERG, GERMANY.

MANUFACTURE OF A SUBSTITUTE FOR CAOUTCHOUC.

SPECIFICATION forming part of Letters Patent No. 786,527, dated April 4, 1905.

Application filed August 18, 1904. Serial No. 221,293.

*To all whom it may concern:*

Be it known that I, HEINRICH SPATZ, a subject of the King of Prussia, Emperor of Germany, and a resident of Schöneberg, near Berlin, in the Empire of Germany, have invented new and useful Improvements in the Manufacture of a Substitute for Caoutchouc, of which the following is a clear and full specification.

The object of the present invention is the manufacture of a substitute for caoutchouc by means of the treatment of fat oils with sulfur and chlorid of sulfur. The product obtained hereby is distinguished from other substitutes for caoutchouc prepared by means of sulfur and chlorid of sulfur by its high degree of elasticity and its property of preserving the elasticity for a long time.

The process that forms the object of the present invention consists in dissolving amber colophonium in a fat oil, especially castor-oil, heating the solution for some time with a relatively small quantity of sulfur, and treating the sulfurized product after cooling with ozone. Finally, the mass is treated with chlorid of sulfur in the presence of a solvent—for instance, benzol—while carbonates, such like calcium carbonate, are added. Care should be taken that an increase of temperature is avoided during the treatment with chlorid of sulfur. Profitably the temperature is kept below 0° centigrade. The product obtained after the treatment with chlorid of sulfur is washed for removing free hydrochloric acid and calcium chlorid, pressed, and dried.

In practice the process is carried out thus: One hundred grams of amber colophonium are dissolved in one kilo of castor-oil that has been previously heated up to 180° centigrade. Forty-five grams of flowers of sulfur are very gradually added, while the temperature is maintained at about 180° centigrade. The addition of the sulfur in the quantity stated and the heating takes up about four hours. The mass is allowed to cool and then ozone is passed through it until it has become stiff and similar to caoutchouc in its appearance. One hundred grams of chlorid of sulfur, one hundred and fifty grams of calcium carbonate, and one hundred and twenty grams of benzol are then added for each kilo of the mass, while the temperature is kept below 0° centigrade, or, better still, below −6° centigrade. The addition of chlorid of sulfur must be done slowly and in small portions at a time in order to avoid a vehement reaction. The calcium chlorid formed and the hydrochloric acid, if present, are removed by washing with water. The mass is finally calendered between rollers, one of which is hot and the other cold. The product thus obtained is very similar to natural caoutchouc in its physical and chemical properties.

I am well aware of its having been suggested to vulcanize fat oils with chlorid of sulfur while alkalies or carbonates are added at the same time or to treat fat oils before the addition of chlorid of sulfur with sulfur or air or to dissolve rosin in a fat oil. From all these processes the present invention is distinguished that by the combination claimed and by the choice of certain and distinct raw materials a product is obtained which is very much like the natural caoutchouc as regards its physical and chemical properties and is greatly superior to the substitutes for caoutchouc known in commerce as regards elasticity and resistance to wear and tear.

Having now particularly described and ascertained the nature of my invention and in what manner the same is to be performed, I declare that what I claim is—

A process for preparing a substitute for caoutchouc consisting in dissolving amber colophonium in castor-oil, subjecting the solution to the action of sulfur while at a high temperature, passing ozone through the solution and finally treating the mass with chlorid of sulfur in the presence of a solvent and calcium carbonate, essentially as described.

In witness whereof I have hereunto set my hand in presence of two witnesses.

HEINRICH SPATZ.

Witnesses:
 CARL HERRLICH,
 SIEGFRIED HERZBERG.